United States Patent
Snyder et al.

(10) Patent No.: US 8,760,674 B2
(45) Date of Patent: Jun. 24, 2014

(54) MULTIPLE SETTING USER INTERFACE WITH VISUAL ICONS FOR CUSTOMIZED USABILITY

(75) Inventors: Trevor J. Snyder, Newberg, OR (US); Jennifer Misae Miyamoto, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 360 days.

(21) Appl. No.: 13/192,589

(22) Filed: Jul. 28, 2011

(65) Prior Publication Data
US 2013/0027725 A1 Jan. 31, 2013

(51) Int. Cl.
*G06F 3/12* (2006.01)
(52) U.S. Cl.
USPC .......... 358/1.13; 358/1.14; 358/1.15; 399/70; 399/81; 399/88; 399/75; 399/44; 715/832; 715/833; 715/935; 715/974
(58) Field of Classification Search
CPC ............... H04N 1/0035; H04N 2201/0094; G06F 3/0236; G06F 3/04847; G06F 3/0488; G06F 3/0482; G06F 21/36
USPC ............. 358/1.13, 1.14, 1.15; 399/70, 81, 88, 399/75, 38, 44, 69; 715/832, 833, 935, 974
See application file for complete search history.

(56) References Cited

U.S. PATENT DOCUMENTS

| | | | |
|---|---|---|---|
| 6,032,004 A | 2/2000 | Mirabella, Jr. et al. | |
| 6,327,051 B1 | 12/2001 | Moro et al. | |
| 6,614,456 B1 * | 9/2003 | Rzepkowski et al. | 715/833 |
| 7,082,211 B2 | 7/2006 | Simon et al. | |
| 7,408,674 B2 | 8/2008 | Moro et al. | |
| 2003/0063130 A1 * | 4/2003 | Barbieri et al. | 345/833 |
| 2004/0051891 A1 * | 3/2004 | Moro et al. | 358/1.9 |
| 2005/0031392 A1 * | 2/2005 | Yamamoto et al. | 400/62 |
| 2005/0105129 A1 | 5/2005 | Takahashi | |
| 2005/0140996 A1 | 6/2005 | Horiuchi et al. | |
| 2005/0254835 A1 * | 11/2005 | Takei | 399/12 |
| 2007/0024874 A1 | 2/2007 | Kawamura | |
| 2010/0271492 A1 | 10/2010 | Gyotoku | |
| 2011/0032551 A1 | 2/2011 | Faber et al. | |

* cited by examiner

*Primary Examiner* — Jacky X Zheng
(74) *Attorney, Agent, or Firm* — Gibb & Riley, LLC (57) ABSTRACT

A printing apparatus/method includes at least one processor, at least one printing engine, and at least one graphic user interface all operatively (directly or indirectly) connected to each other. The graphic user interface has at least one display and at least one user input device. The display provides at least one menu having at least one user selectable parameter of the printing engine. The display provides at least one linear scale bar representing a range of values to which the selectable parameter can be set. The display provides at least two different graphic icons along the linear scale. The graphic icons conceptually represent different performance characteristics that the printing apparatus will have when the selectable parameter is set to different values along the range of values represented on the linear scale. The display can also provide numerical performance values adjacent each of the different graphic icons.

16 Claims, 6 Drawing Sheets

MULTIPLE SETTING USER INTERFACE WITH VISUAL ICONS FOR CUSTOMIZED USABILITY

BACKGROUND

Embodiments herein generally relate to printing devices having graphic user interface displays, and more particularly to displays that include linear scales and graphic icons to allow user customization.

The offset solid ink printing process has advantages over traditional ink jet printing technology and laser printing. Such advantages include good printing speed, color gamut, water fastness, media flexibility, run cost, etc. These properties are achieved with the use of a solid ink that is melted and jetted onto an intermediate transfer surface prior to being transferred and fixed onto the media. In this process, both the ink temperature and the transfer surface need to be heated and the ink must be kept molten even when not in continuous use. If the printer is shut down, an extended warm-up time is required as well as a purge cycle, which wastes a given amount of ink. However, new and upcoming environmental and government regulations are starting to demand that the printer enter power modes that are too low to keep the ink molten. What are needed are mechanisms and methods that allow for a reduced energy consumption and governmental compliance, while still providing an acceptable or even advantageous customer experience.

SUMMARY

One exemplary printing apparatus herein includes at least one processor, at least one printing engine, and at least one graphic user interface all operatively (directly or indirectly) connected to each other. The graphic user interface has at least one display and at least one user input device. The display provides at least one menu having at least one user selectable parameter of the printing engine. For example, there can be a menu for warm-up speed, marking material recycling quantity, printing speed, etc.

The display also provides at least one linear scale bar representing a range of values to which the selectable parameter can be set. The display provides at least two different graphic icons along the linear scale. The graphic icons conceptually represent different performance characteristics that the printing apparatus will have when the selectable parameter is set to different values along the range of values represented on the linear scale. The display can also provide numerical performance values adjacent each of the different graphic icons.

For example, the graphic icons can be two-dimensional non-textural graphic figures of, for example, different forms of light bulbs conceptually representing different amounts of power consumption for different warm-up speeds; different forms of a printed sheet conceptually representing different print qualities for different marking material recycling quantities; different forms of human ears conceptually representing different volume levels for different printing speeds, etc.

An exemplary method herein controls a printing apparatus that has at least one display, by providing at least one menu comprising at least one user selectable parameter on the display; providing at least one linear scale representing a range of values to which the selectable parameter can be set on the display; and providing at least two different graphic icons on the display along the linear scale. The graphic icons conceptually represent different performance characteristics that the printing apparatus will have when the selectable parameter is set to different values along the range of values represented on the linear scale.

This method can also be stored in a computer storage device comprising a non-transitory computer-readable storage medium storing a program of instructions executable by a computer. The program of instructions causes the computer to perform the foregoing method.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

This disclosure presents various user interfaces and processes that help the customer achieve the best printer performance for their specific needs. For example, with embodiments herein, the user can easily select between the absolute lowest energy consumption possible and still achieve an acceptable time to first print. This disclosure provides a simple way for the customer to customize their experience and also understand what choice they are making in terms of energy usage and device performance. There is no such thing as an average customer, and one size does not fit all with respect to printing devices. For example, many people will prefer a faster warm-up vs. a marginal energy savings. This could be especially true if the customer had a better understanding of exactly what cost/performance choices they are making.

Figure 1:
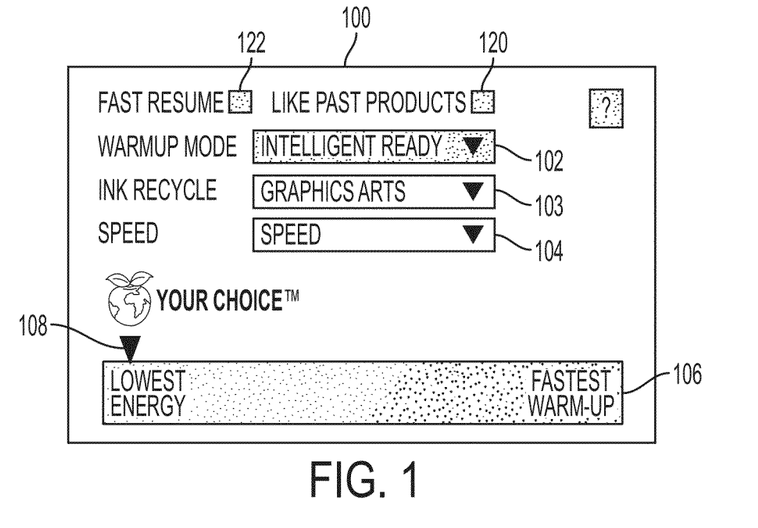
FIG. 1 is a side-view schematic diagram of a display according to embodiments herein.

For example, FIG. 1 is a screenshot of a printer's display device 100 that includes different menu selections 102-104 as well as a linear scale 106 representing a range of values to which various selectable parameters can be set. In FIG. 1, the menu selections include three different customization parameters to customize, warm-up mode vs. energy usage 102, ink recycle quantity (percentage) vs. black density 103, and printing speed vs. sound level 104. While these three exemplary menu selections are utilized in the drawings, the embodiments herein are not limited to only these three menu items. To the contrary, as would be understood by those ordinarily skilled in the art, any parameter of the printing device that can be adjusted by the user can be presented as a menu choice on the display device 100.

In the example shown in FIG. 1, the warm-up parameter 102 has been activated and is shown darkened. When the warm-up mode menu item 102 is selected by the user, a visual slider bar 106 representing the range of values to which the warm-up parameters can be set is shown at the bottom. If selection arrow 108 is dragged the furthest right, the printer will operate in its fastest warm-up capability.

Figure 2:
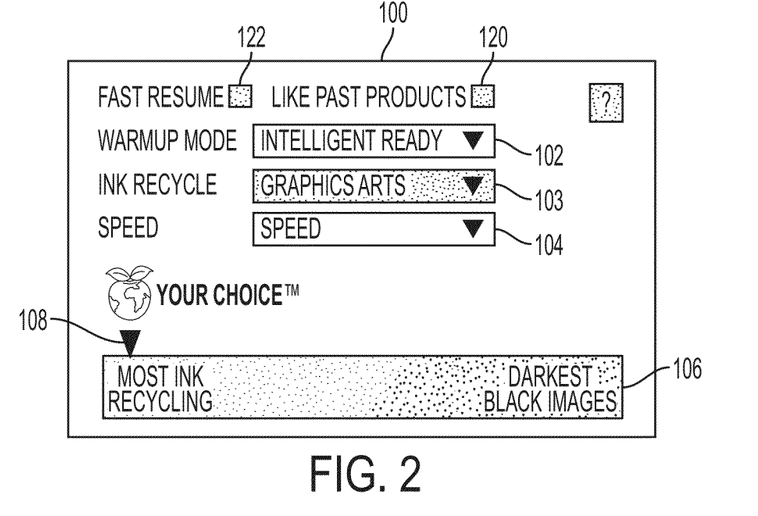
FIG. 2 is a side-view schematic diagram of a display according to embodiments herein.
Figure 3:
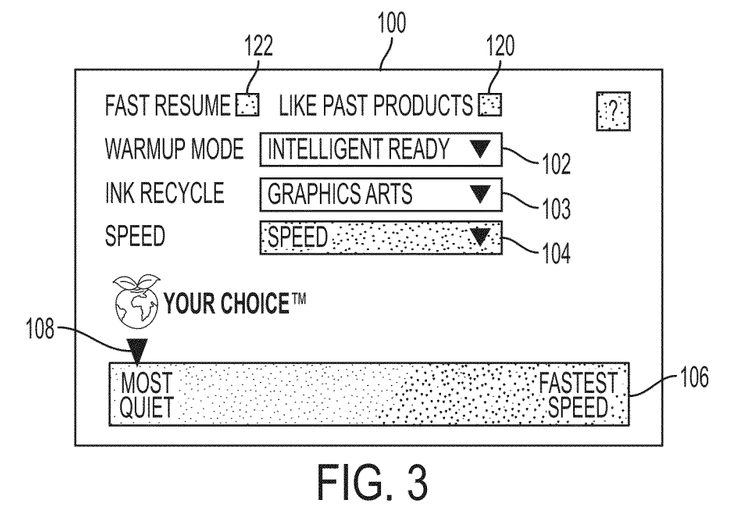
FIG. 3 is a side-view schematic diagram of a display according to embodiments herein.

As shown in FIGS. 2 and 3, when the other two menu selection buttons 103, 104 are selected by the user, a similar slider bar 106 is displayed, but with appropriate wording and icons for the ink recycle (FIG. 2) longest warm-up (FIG. 3).

Another feature illustrated in FIG. 1 is a menu button allowing the user to select "Like past products" 120. This menu button 120 automatically sets a multitude of parameters (all at once, with one simple check of the menu button 120). For example, if a customer had a previous product (e.g., a different printer) and they were happy with that product, they can select this option 120 and the current printer will be customized to the previous printer's parameter settings. Upon selection of menu button 120, the display 100 shows a list of previously known printers from which the user can select a specific printer for the current printer to be modeled after. This allows the user to easily and quickly select custom parameter settings for their current printer.

Thus, embodiments herein provide a visual indication of the usability/performance trade-off for each different customer selection to show graphically the effect of the choice the customer is making. For example, if a customer thinks the printer is going to "substantially waste heat or energy" by moving to a higher energy and faster warm-up, then they will be very reluctant to move the pointer 108 in bar 106 to the right. However, by displaying that the printer actually only uses 30 Watts even in the highest energy state (See FIG. 7, discussed below) they will be much more informed and enabled to make the right choice for their personal needs and/or their company desire for energy conservation and/or environmental goals.

Figure 4:
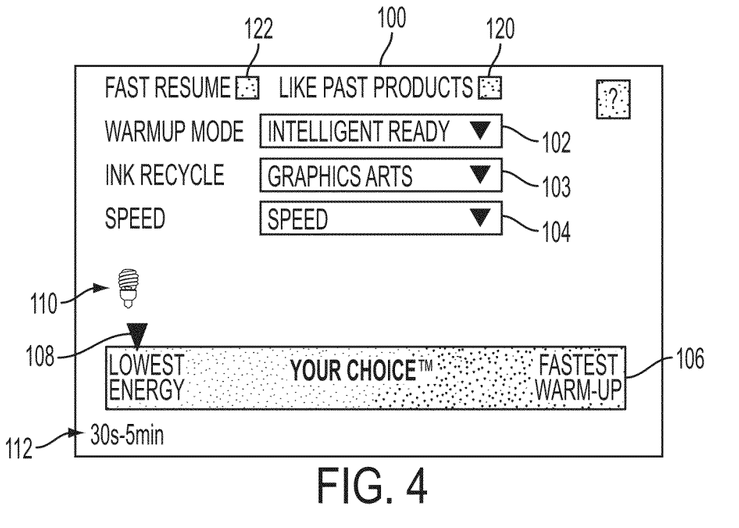
FIG. 4 is a side-view schematic diagram of a display according to embodiments herein.
Figure 7:
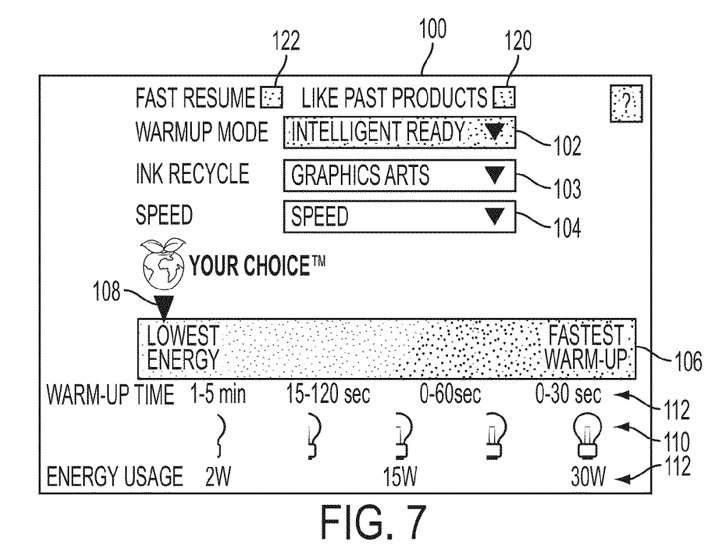
FIG. 7 is a side-view schematic diagram of a display according to embodiments herein.

FIG. 4 illustrates one possible implementation of a visual icon 110 for energy and usability customization. As shown in FIG. 4, the arrow 108 is on the left side of the bar 106 because the customer has selected the lowest energy setting. Here the icon 110 is a relatively small incandescent light bulb and a textual indication 112 appears below the icon 110 indicating a warm-up time of 30 s to 5 minutes. As shown in FIG. 7, the textual indication 112 could also show a wattage value (e.g., 2 W).

Figure 5:
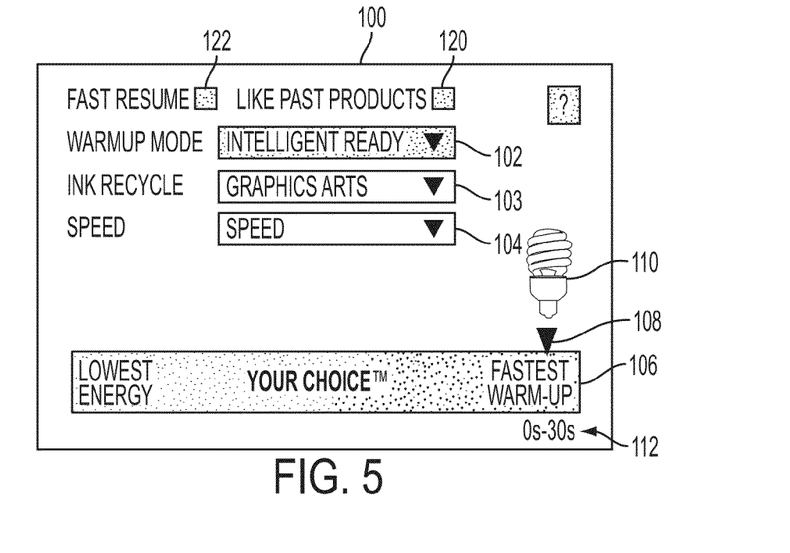
FIG. 5 is a side-view schematic diagram of a display according to embodiments herein.

Alternatively, as shown in FIG. 5, the arrow 108 is on the right side of the bar 106 because the customer has selected the highest energy setting. Therefore, the icon 110 on the right shows a relatively larger incandescent light bulb, and the textual indication 112 shows that the warm-up time has been reduced to 0-30 s. In FIG. 7, the textual indication 112 also shows a 30 W value on the icon 110. With such a display, more users will understand better the choice they are making.

Figure 6:
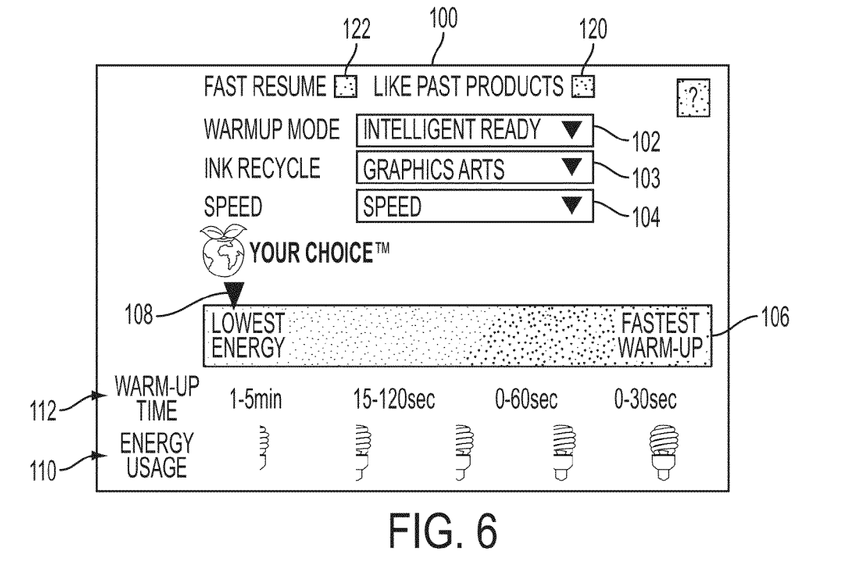
FIG. 6 is a side-view schematic diagram of a display according to embodiments herein.

While the previous drawings changed the size of the icon 110 and changed the corresponding textural indication 112 as the arrow 108 was moved along the bar 106, in another embodiment shown in FIG. 6, a number of different icons 110 and textural indications 112 can be simultaneously displayed. The display in FIG. 6 constantly provides the user with performance information (such as warm-up time and energy usage) to help the user set the parameter at a value that corresponds with the individual user's trade-off point. Also note that in FIG. 6, rather than using different sized icons 110, partial and full icons 110 are utilized as a graphic aid regarding power consumption for the user. FIG. 7 is similar to FIG. 6; however, in FIG. 7 multiple textural indications 112 are utilized to indicate the warm-up time and the power consumption numerically. Another difference between FIG. 7 and FIG. 6 is that the actual amount of the light shown is directly correlated with the actual amount of power used by the printer at the different settings.

Figure 8:
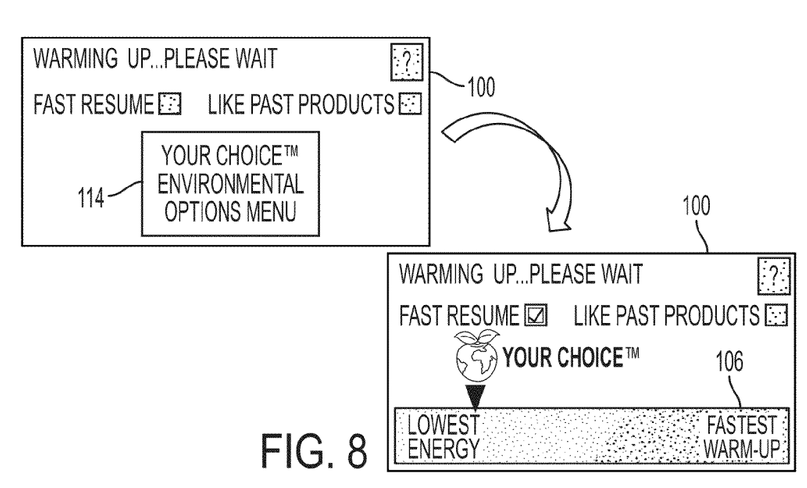
FIG. 8 is a side-view schematic diagram of a display according to embodiments herein.

FIG. 8 illustrates an additional screenshot that can be presented to the customer during the times in which the customer would most likely need specific customization. For example, FIG. 8 is an example of what could be displayed during the warm-up of the printer, where both a "fast resume" 122 and the previously discussed "like past products" 120 menu buttons are enabled. If the fast resume menu button 122 is selected by the user, previously established settings will be reset and the highest energy setting will be used in the future to provide faster warm-up. Also, FIG. 8 illustrates an "environmental options" main menu button 114. If the environmental options menu button 114 is activated by the user, the display will change (as shown by the curved arrow in FIG. 8) to allow the user to adjust the energy/warm-up bar 106. A similar menu button 114 can also be presented for other usability parameters. For example, a speed parameter menu button 114 is shown when the printer is printing, and an ink recycle menu button 114 is shown both during printing and during warm-up (as recycling impacts the image quality and the energy (though the purge process)).

Figure 9:
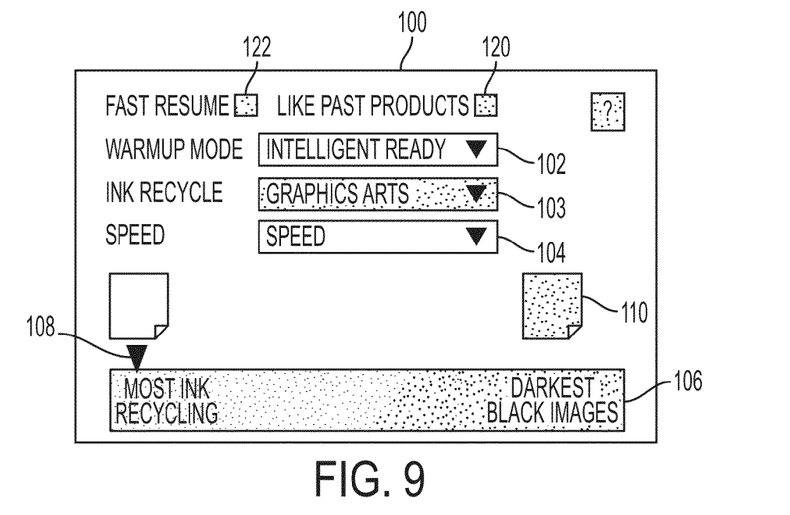
FIG. 9 is a side-view schematic diagram of a display according to embodiments herein.
Figure 10:
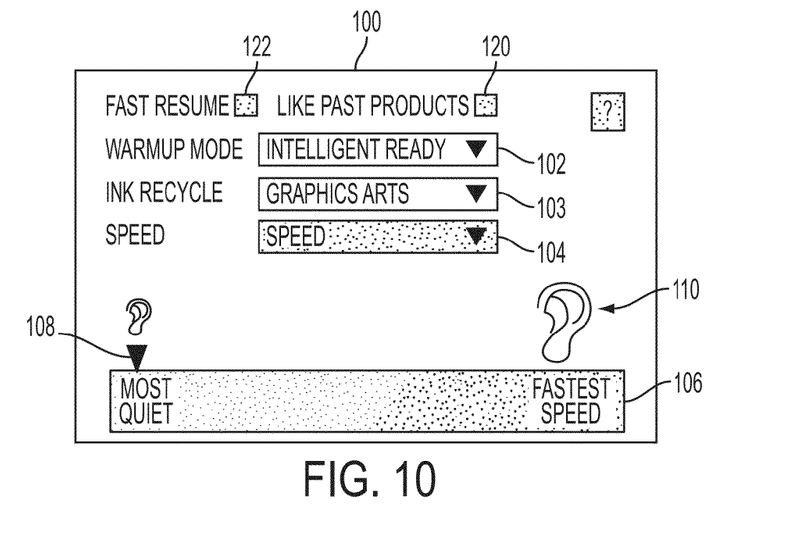
FIG. 10 is a side-view schematic diagram of a display according to embodiments herein.

FIGS. 9 and 10 illustrate two of many more icons that could be used with embodiments herein. For example, in FIG. 9, icons 110 showing different darkness printed sheets are used, and in FIG. 10, icons 110 of large and small human ears are used.

As mentioned above, any parameter of the printing device that can be adjusted by the user can be presented as a menu choice on the display device 100. Therefore, as additional examples, other menu choices could relate to environmental friendliness, run cost, etc. The environmental friendliness slider bar can change power consumption, reduce toner usage, perform more duplexing, etc., as the bar is moved from one side to the other (and icons are used to graphically show these changes). Similarly, the run cost slider bar can change power consumption, reduce toner usage, perform more duplexing, change to a paper supply that uses less expensive paper, change to a less expensive toner selection, etc., as the bar is moved from one side to the other (and icons are used to graphically show these changes). While a few limited examples are discussed herein, those ordinarily skilled in the art would understand that the embodiments herein are applicable to all parameters that are subject to change (whether currently known, or developed in the future).

Therefore, this disclosure provides a user interface and user interface process which helps the customer achieve a desired usability customization for their specific needs. This not only provides a simple way for the customer to customize their experience, but to also understand the impacts produced by the choice they are actually making. This not only allows for increased customer satisfaction, but also communicates the actual facts about the printer.

Figure 11:
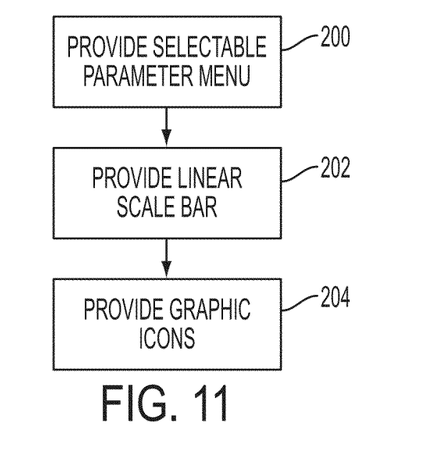
FIG. 11 is a flow diagram illustrating operation of the embodiments herein.

FIG. 11 is flowchart illustrating an exemplary method that controls a printing apparatus that has at least one display, by providing at least one menu comprising at least one user selectable parameter on the display 200; providing at least one linear scale representing a range of values to which the selectable parameter can be set on the display 202; and providing at least two different graphic icons on the display along the linear scale 204. The graphic icons conceptually represent different performance characteristics that the printing apparatus will have when the selectable parameter is set to different values along the range of values represented on the linear scale.

Figure 12:
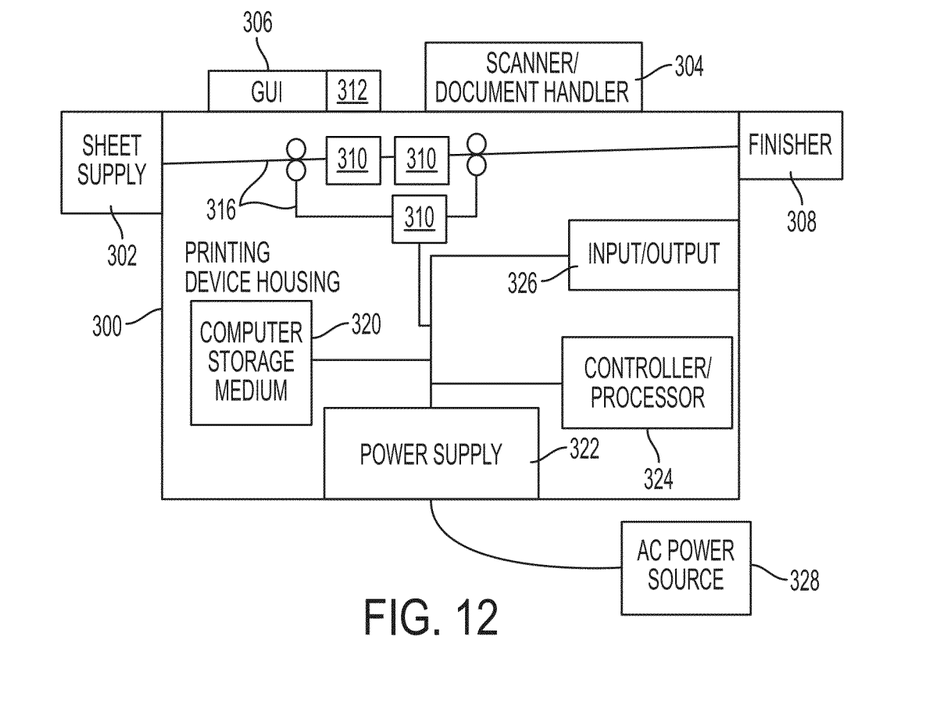
FIG. 12 is a side-view schematic diagram of a printing device according to embodiments herein.

FIG. 12 illustrates a computerized printing device 300, which can be used with embodiments herein and can comprise, for example, a printer, copier, multi-function machine, etc. The printing device 300 includes a controller/processor 324, at least one marking device (printing engines) 310 operatively connected to the processor 324, a media path 316 positioned to supply sheets of media from a sheet supply 302 to the marking device(s) 310, and a communications port (input/output) 326 operatively connected to the processor 324 and to a computerized network external to the printing device. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium device 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components.

The graphic user interface 306 has at least one display 100 and at least one well-known user input device 312 (such as a mouse, trackball, touchpad, keyboard, hard buttons, and/or touchscreen, etc.). The display 100 provides at least one menu having at least one user selectable parameter of the printing engine. For example, there can be a menu for warm-up speed, marking material recycling quantity, printing speed, etc.

The display 100 also provides at least one linear scale bar representing a range of values to which the selectable parameter can be set. The display 100 provides at least two different graphic icons along the linear scale. The graphic icons conceptually represent different performance characteristics that the printing apparatus 300 will have when the selectable parameter is set to different values along the range of values represented on the linear scale. The display 100 can also provide numerical performance values adjacent each of the different graphic icons.

For example, the graphic icons can be two-dimensional non-textural graphic figures of, for example, different forms of light bulbs conceptually representing different amounts of power consumption for different warm-up speeds; different forms of a printed sheet conceptually representing different print qualities for different marking material recycling quantities; different forms of human ears or speakers conceptually representing different volume levels for different printing speeds, etc.

As would be understood by those ordinarily skilled in the art, the printing device 300 shown in FIG. 12 is only one example and the embodiments herein are equally applicable to other types of printing devices that may include fewer components or more components. For example, while a limited number of printing engines and paper paths are illustrated in FIG. 12, those ordinarily skilled in the art would understand that many more paper paths and additional printing engines could be included within any printing device used with embodiments herein.

Thus, as shown above the present embodiments provide a multi-parameter environmental user interface configuration process that allows customers to optimize a printing machine for their specific requirements. A few of the possible parameters that can be optimized include energy consumption, warm-up time, print speed and noise. This provides an intuitive user interface that allows a customer to use slider bars to adjust various parameters. The user simply clicks on the pointer and slides it to the desired location on the scale. The scale may include text or icons such as various size light bulbs which indicate the amount of energy use. This can be used as part of a green solution and provides a visible, intuitive indication of usability trade-offs; customization of printer attributes to meet each customer's needs; ability to select a previous/current product a customer might have and use it's attributes to configure a different machine; and improved customer satisfaction by allowing users to visually see the ramifications of their choices.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A printing apparatus comprising:
   at least one graphic user interface,
   said graphic user interface comprising at least one display and at least one user input device,
   said display providing at least one menu comprising at least one user selectable parameter,
   said display providing at least one linear scale representing a range of values to which said selectable parameter can be set,
   said display providing at least two different graphic icons along said linear scale, and
   said graphic icons conceptually representing different performance characteristics that said printing apparatus will have when said selectable parameter is set to different values along said range of values represented on said linear scale, and
   said graphic icons comprising:
   different forms of light bulbs conceptually represent different amounts of power consumption for different warm-up speeds;
   different forms of a printed sheet conceptually representing different print qualities for different marking material usage quantities; and
   different forms of human ears conceptually representing different sound volume levels for different printing speeds.

2. The printing apparatus according to claim 1, said at least one user selectable parameter comprising:
   warm-up speed;
   marking material usage quantity; and
   printing speed.

3. The printing apparatus according to claim 1, said graphic icons graphically representing:
   different amounts of power consumption for different warm-up speeds;
   different print qualities for different marking material usage quantities; and
   different sound volume levels for different printing speeds.

4. The printing apparatus according to claim 1, said graphic icons comprising two-dimensional non-textural graphic figures.

5. A printing apparatus comprising:
   at least one processor;
   at least one printing engine operatively connected to said processor; and
   at least one graphic user interface operatively connected to and controlled by said processor,
   said graphic user interface comprising at least one display and at least one user input device,
   said display providing at least one menu comprising at least one user selectable parameter of said printing engine,
   said display providing at least one linear scale representing a range of values to which said selectable parameter can be set,
   said display providing at least two different graphic icons along said linear scale, said graphic icons conceptually representing different performance characteristics that said printing apparatus will have when said selectable parameter is set to different values along said range of values represented on said linear scale,
   said display providing numerical performance values adjacent each of said different graphic icons, and
   said graphic icons comprising:
   different forms of light bulbs conceptually represent different amounts of power consumption for different warm-up speeds;
   different forms of a printed sheet conceptually representing different print qualities for different marking material usage quantities; and
   different forms of human ears conceptually representing different sound volume levels for different printing speeds.

6. The printing apparatus according to claim 5, said at least one user selectable parameter comprising:
   warm-up speed;
   marking material usage quantity; and
   printing speed.

7. The printing apparatus according to claim 5, said graphic icons graphically representing:
   different amounts of power consumption for different warm-up speeds;
   different print qualities for different marking material usage quantities; and
   different sound volume levels for different printing speeds.

8. The printing apparatus according to claim 5, said graphic icons comprising two-dimensional non-textural graphic figures.

9. A method of controlling a printing apparatus comprising at least one display, said method comprising:
   providing at least one menu comprising at least one user selectable parameter on said display;
   providing at least one linear scale representing a range of values to which said selectable parameter can be set on said display; and
   providing at least two different graphic icons on said display along said linear scale,
   said graphic icons conceptually representing different performance characteristics that said printing apparatus will have when said selectable parameter is set to different values along said range of values represented on said linear scale, and
   said graphic icons comprising:
   different forms of light bulbs conceptually represent different amounts of power consumption for different warm-up speeds;
   different forms of a printed sheet conceptually representing different print qualities for different marking material usages quantities; and
   different forms of human ears conceptually representing different sound volume levels for different printing speeds.

10. The method according to claim 9, said at least one user selectable parameter comprising:
    warm-up speed;
    marking material usage quantity; and
    printing speed.

11. The method according to claim 9, said graphic icons graphically representing:
- different amounts of power consumption for different warm-up speeds;
- different print qualities for different marking material usage quantities; and
- different sound volume levels for different printing speeds.

12. The method according to claim 9, said graphic icons comprising two-dimensional non-textural graphic figures.

13. A computer storage device comprising a non-transitory computer-readable storage medium storing a program of instructions executable by a computer, said program of instructions causing said computer to perform a method of controlling a printing apparatus comprising at least one display, said method comprising:
- providing at least one menu comprising at least one user selectable parameter on said display;
- providing at least one linear scale representing a range of values to which said selectable parameter can be set on said display; and
- providing at least two different graphic icons on said display along said linear scale,
- said graphic icons conceptually representing different performance characteristics that said printing apparatus will have when said selectable parameter is set to different values along said range of values represented on said linear scale, and said graphic icons comprising:
- different forms of light bulbs conceptually represent different amounts of power consumption for different warm-up speeds;
- different forms of a printed sheet conceptually representing different print qualities for different marking material usages quantities; and
- different forms of human ears conceptually representing different sound volume levels for different printing speeds.

14. The computer storage device according to claim 13, said at least one user selectable parameter comprising:
- warm-up speed;
- marking material usage quantity; and
- printing speed.

15. The computer storage device according to claim 13, said graphic icons graphically representing:
- different amounts of power consumption for different warm-up speeds;
- different print qualities for different marking material usage quantities; and
- different sound volume levels for different printing speeds.

16. The computer storage device according to claim 13, said graphic icons comprising two-dimensional non-textural graphic figures.

* * * * *